United States Patent [19]
Iwata

[11] 4,084,167
[45] Apr. 11, 1978

[54] FLASH AND CAMERA DEVICE

[75] Inventor: Hiroshi Iwata, Osaka, Japan

[73] Assignee: West Electric Company, Ltd., Osaka, Japan

[21] Appl. No.: 777,079

[22] Filed: Mar. 14, 1977

[30] Foreign Application Priority Data

Mar. 17, 1976 Japan ................... 51-29510

[51] Int. Cl.² ............................................. G03B 15/05
[52] U.S. Cl. ........................................ 354/33; 354/35; 354/145
[58] Field of Search ............... 354/32, 33, 34, 35, 354/139, 145, 149, 266

[56] References Cited
U.S. PATENT DOCUMENTS

| 3,465,656 | 9/1969 | Wick et al. ........................... 354/34 |
| 3,684,917 | 8/1972 | Uno et al. ........................... 354/145 X |

FOREIGN PATENT DOCUMENTS 49-5618  1/1974  Japan.

Primary Examiner—L. T. Hix
Assistant Examiner—M. L. Gellner
Attorney, Agent, or Firm—Stevens, Davis, Miller & Mosher

[57] ABSTRACT

A combined device of photographic camera device and an electronic flash device in which a charged energy in a main discharge capacitor is consumed by a flash discharge tube to emit flash light, comprises a switch mechanism linked to a shutter button to be turned on by the actuation of the shutter button to allow the feed of a power supply to the main discharging capacitor, and a further switching circuit operative when a brightness detected by a brightness sensing circuit is low to activate a holding circuit for maintaining the switch mechanism in its on state and deactivate the holding circuit when a predetermined charge has been stored in the main discharging capacitor.

7 Claims, 2 Drawing Figures

FLASH AND CAMERA DEVICE

The present invention relates to a combined device of a photographic camera device and an electronic flash device, and more particularly to a flash and camera device in which the connection of a power supply to an electronic flash device is automatically effected depending on a brightness of an object and the connection of the power supply to the electronic flash device is automatically disconnected after a shutter release has been depressed to actuate a shutter.

The Japanese Laid-Open Patent Application 5618/74 discloses a combined device of a photographic camera device and an electronic flash device with a function of automatically connecting a power supply to the electronic flash device when a brightness of an object is lower than a predetermined value. The device disclosed therein includes a means for actuating a switch mounted with an electromagnet in an object brightness sensing circuit in association with a shutter release when the brightness of the object is low to connect the power supply to the electronic flash device.

In such a prior art device, however, since the power supply is connected to the electronic flash device only while the shutter release is being depressed, the shutter release must be kept depressed for a long time period when a charging time for a main discharging capacitor in the electronic flash device is long. This is troublesome for a use.

Furthermore, in the disclosed prior art device, the switch for making the connection of the power supply to the electronic flash device is usually a contact of the small-size electromagnet which is used to lock the shutter release. Thus, because of a low attraction force of the small-size electromagnet, a contact having a large current capacity cannot be used. Nevertheless, since a large current of the order of several amperes flow through the contact in an initial stage of the operation of the electronic flash device, a problem of fusing and damage of the contact may occur.

The present invention is intended to overcome the above problems encountered in the prior art device.

A further object of the present invention is to provide an improved full-automatic photographic camera-flash device combination.

The objects, features and advantages of the present invention will become apparent from the following detailed description of the preferred embodiments of the invention when taken in conjunction with the accompanying drawings.

Figure 1:
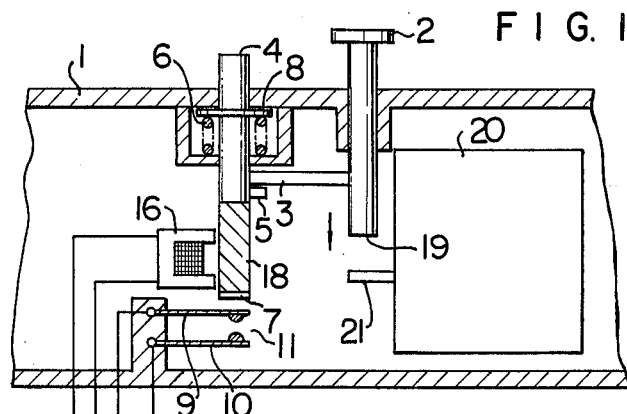
FIG. 1 shows one embodiment of a flash and camera device of the present invention and particularly shows a sectional view of a major mechanical section and an electric circuit diagram.

Referring to FIG. 1, a flash and camera device according to the present invention comprises a housing 1 which accommodates a shutter mechanism 20 including lenses and a diaphragm, not shown, a shutter button 2 having a pin 3 and elements for feeding a power supply to be described later, an object brightness sensing circuit 13, a first switch circuit 12 actuated by the object brightness sensing circuit 13, a second switch circuit 28 responsive to the object brightness sensing circuit 13, a third switch circuit 17 actuable by the second switch circuit 28, and an electronic flash device 22 operable to emit flash light in response to the actuation of the third switch circuit 24.

Further accommodated in the housing 1 are a movable member 4 having a magnet pole 18, which member is normally biased upward by a spring force of a spring 6 which acts on a projection 8 and moved downward with the depression of the shutter button 2, a switch 11 having electric contacts 9 and 10 which are made by the downward movement of the movable member 4 to permit the feeding of a power supply to a DC — DC converter 37 of the electronic flash device 22, the object brightness sensing circuit 13 and other switch circuits, and an electromagnet 16 operative to attract the magnet pole 18 of the movable member 4 until a main discharging capacitor 23 of the electronic flash device 22 is charged to a predetermined amount to block the downward movement of the shutter button 2.

The operation of the device thus constructed is now explained for two modes of operation, one for a high object brightness and the other for a low object brightness.

(1) Operation in a high object brightness condition

When the shutter button 2 is depressed, the pin 3 which is integral with the shutter button 2 moves the projection 5 of the movable member 4 downward to move the movable member 4 downward. As a result, an end 7 of the movable member 4 contacts with the resilient electric contacts 9 and 10 to close the switch 11.

As a result, the brightness sensing circuit 13 starts to operate. When the object brightness is high, a resistance of a CdS photosensor is low resulting in a low voltage thereacross. Thus, an SCR switching device 15 does not receive a sufficient gate voltage to render it conductive but it remains non-conductive. Accordingly, a closed loop starting from a positive terminal of a power supply 17, through the switch 11, the resistor 39, the electromagnet 16, an anode of the SCR 15, a cathode thereof to a negative terminal of the power supply 17 is not established, and the electromagnet 16 is not energized.

Therefore, the magnet pole 18 of the movable member 4 is not attracted by the electromagnet 16 and the shutter button 2 is allowed to be further moved downward.

As a result, an end 19 of the shutter button 2 depresses a shutter lever 21 of the shutter mechanism 20 so that the shutter mechanism 20 (which may be a conventional mechanical shutter which imparts a spring force charged during the winding of a film to a shutter vane drive mechanism in response to the movement of a shutter lever to actuate the shutter vanes) is operated to actuate the shutter. Thereafter, as the movable member 4 is moved upward by the spring force of the spring 6, the switch 11 is opened.

As the switch 11 is closed by the downward movement of the movable member 4 which is moved with the downward movement of the shutter button 2, the power supply 17 is also connected to the DC — DC converter circuit 37 of the electronic flash device 22 so that the main discharge capacitor 23 is charged. However, since the second switch circuit 28 comprising transistors 26 and 27 is connected between a gate and a cathode of a switching element 25 such as SCR of a third switch circuit 24 for activating a trigger circuit for causing the electronic flash device 22 to emit flash light, and the transistor 27 is non-conductive while the transistor 26 is conductive in the high object brightness condition, the switching element 25 does not conduct. As a result, the electronic flash device 22 does not operate although the main discharge capacitor 23 thereof is charged. The DC — DC converter circuit 37 is connected to the power supply 17 usually as shown in FIG. 1, which may be the same type as that shown in U.S. Pat. No. 3,831,079 for example.

In the high object brightness condition, a shutter speed is generally high and hence a depression time period of the shutter button 2 by a user is short, and the time period for which the power supply 17 is connected to the DC — DC converter circuit 37 by the closure of the switch 11 is also short. Accordingly, the main discharge capacitor 23 is, in effect, not substantially charged.

(2) Operation in a low object brightness condition

Similarly, as the shutter button 2 is depressed, the power of the power supply 17 is fed to various electric circuits and the brightness detection circuit 13 starts to operate. When the object brightness is low, the resistance of the CdS photosensor 14 is high and the SCR 15 receives a sufficient gate voltage to render it conductive.

As the SCR 15 conduct, the closed loop described above is established and the electromagnet 16 is energized. As a result, the magnet pole 18 is attracted thereby, blocking the downward movement of the shutter button 2 so that the operation of the shutter mechanism 20 is blocked. On the other hand, the main discharge capacitor 23 of the electronic flash device starts to be charged by the oscillating operation of the DC — DC converter circuit 37 upon the closure of the switch 11 and it is charged to a predetermined amount. The charged voltage of the main discharge capacitor 23 causes a detecting element 29 such as a neon tube to fire through a circuit including the neon tube 29, resistor 31, base-emitter of a transistor 30, resistor 38, electromagnet 16 and resistor 39. Thus, a base current flows in the transistor 30 which, in turn, conducts to allow current to flow from the power supply 17 through the switch 11, resistor 39, collector-emitter path of the transistor 30 and SCR 15. The series connection of the transistor 30 and resistor 38 shunts the energizing electric current to be supplied to the electromagnet coil 16, so that the electromagnet 16 can not generate the electromagnetic force enough to attract the magnetic pole 18. The magnetic pole 18 is released to allow further downward movement of the shutter button 2.

As the shutter button 2 is further moved downward, it depresses the shutter lever 21 to actuate the shutter mechanism 20 for closing a well-known synchronizing contact 32 which is linked to shutter vanes, not shown.

Since the voltage across the photosensor 14 is high and the transistor 27 is conductive while the transistor 26 is non-conductive when the synchronizing contact 32 is closed, the SCR 25 receives a gate voltage which is high enough to render it conductive so that the SCR 25 conducts to activate a well-known trigger circuit, not designated with a reference numeral, to cause the flash discharge tube 35 to emit flash light by charged energy of the main discharge capacitor 23. In this manner, photographying cycle completes.

After the shutter button 2 has been depressed to a degree that the shutter lever 21 is operated to complete the flash photograph mode of operation, the movable member 4 is moved upward by the spring force of the spring 6. As a result, the switch 11 is opened.

According to the operation of the present invention, in the electronic flash photographing mode of operation where the object brightness is low, the electromagnet 16 is kept energized even after the shutter button has been released after the depression of the shutter button 2, and the connection of the power supply 17 to the electronic flash device 22 is maintained. Thus a problem encountered in the prior art device where the connection of the power supply is disconnected upon the release of the shutter button 2 is overcome.

Furthermore, since the power switch 11 of the present invention is closed by a manual force by the depression of the movable member 4 which is linked to the shutter button 2, a drive force may be large so that a current capacity of the contacts 9 and 10 forming the switch 11 may be large. This affords an advantage that a problem of poor contact encountered in the prior art device is overcome.

Figure 2:
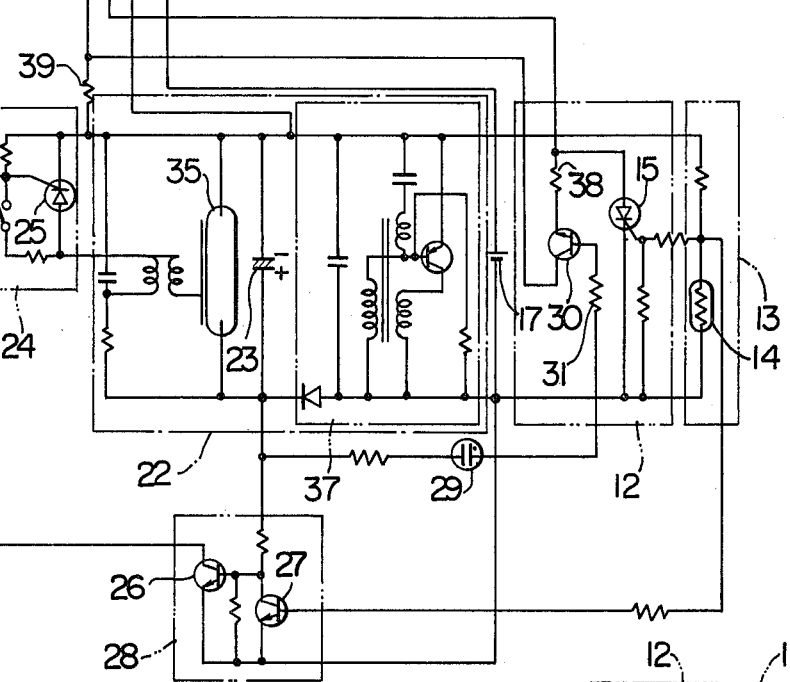
FIG. 2 shows a circuit diagram of other embodiment for a switch circuit of the embodiment shown in FIG. 1.
Figure 2:
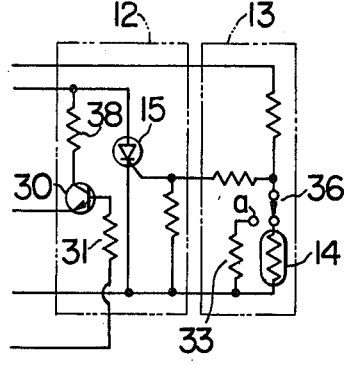

In the embodiment of the present invention, when it is desired to actuate the electronic flash device 22 independently of the object brightness, a separate switch 36 may be provided in the brightness sensing circuit 13 as shown in FIG. 2. Thus, by throwing the switch 36 to a position a, a resistor 33 is inserted instead of the CdS photosensor 14 to establish an operation mode equivalent to that of low object brightness so that the electronic flash device can be actuated independently of the object brightness.

As described hereinabove, the present invention overcomes the drawbacks encountered in the prior art device and allows a user to confirm the connection of the power supply to the electronic flash device by the mechanical movement of the movable member 4. Furthermore, a daylight synchronizing operation mode may be attained by actuating the separate switch so that the electronic flash device is actuated independently of the object brightness.

What is claimed is:

1. A flash and camera device having in combination a photographic camera device and an electronic flash device in which a charged energy in a main discharge capacitor is consumed by a flash discharge tube to emit flash light, comprising:
    a power supply;
    a brightness sensing circuit for sensing a brightness of an object;
    a first switch means linked to a shutter button such that it is turned on by the depression of said shutter button to permit the application of the power of said power supply to said main discharge capacitor;
    a means for maintaining said first switch means at its on state; and
    a second switch means operative to activate said maintaining means to maintain said first switch means at its on state when said brightness of said object is low and deactivate said maintaining means when said main discharge capacitor has been charged to a predetermined level.

2. A flash and camera device according to claim 1 wherein said first switch means includes a first switch having electric contacts operative when they are closed to allow the application of the voltage of said power supply to said main discharge capacitor, and a movable member linked to said shutter button such that it causes the closure of said first switch as said shutter button is depressed.

3. A flash and camera device according to claim 2 wherein said maintaining means includes a magnet pole provided in said movable member and an electromagnet actuable by said second switch means to attract said magnet pole.

4. A flash and camera device according to claim 1, wherein said switch means includes a first switching device operative to be turned on when the brightness of said object is low to actuate said maintaining means, and a second switching device operative to be turned on when said main discharge capacitor has been charged to a predetermined level to deactuate said maintaining means.

5. A flash and camera device according to claim 1 further including a third switch means operative when the brightness of said object sensed by said brightness sensing circuit is high to disable a trigger circuit which causes said flash discharge tube to emit flash light.

6. A flash and camera device according to claim 1, wherein said brightness sensing circuit includes a switch device for disabling the sensing operation of said brightness sensing circuit to allow the operation of said second switch means independently of the brightness of said object.

7. A flash and camera device according to claim 1, wherein said first switch means includes a reset mechanism for automatically releasing the on state of said first switch means after the depression of said shutter button.

* * * * *